C. AALBORG.
ELECTRIC CIRCUIT REGULATOR.
APPLICATION FILED MAR. 9, 1908.
1,104,796.
Patented July 28, 1914.
2 SHEETS—SHEET 1.
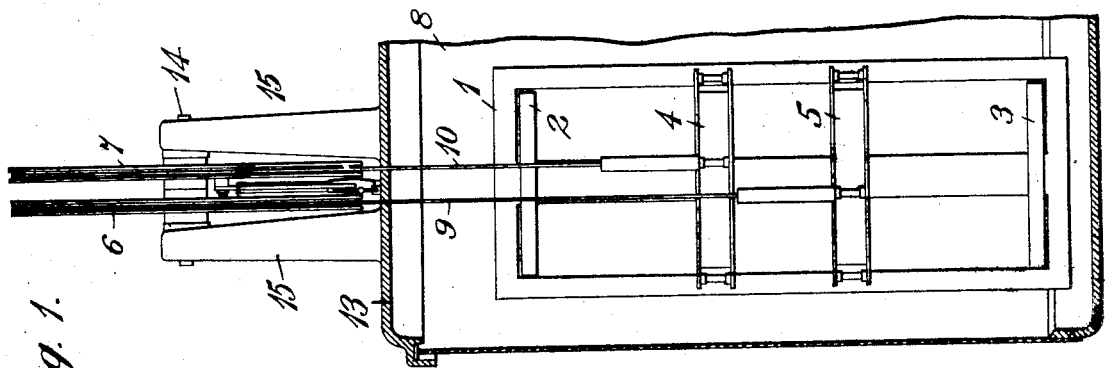
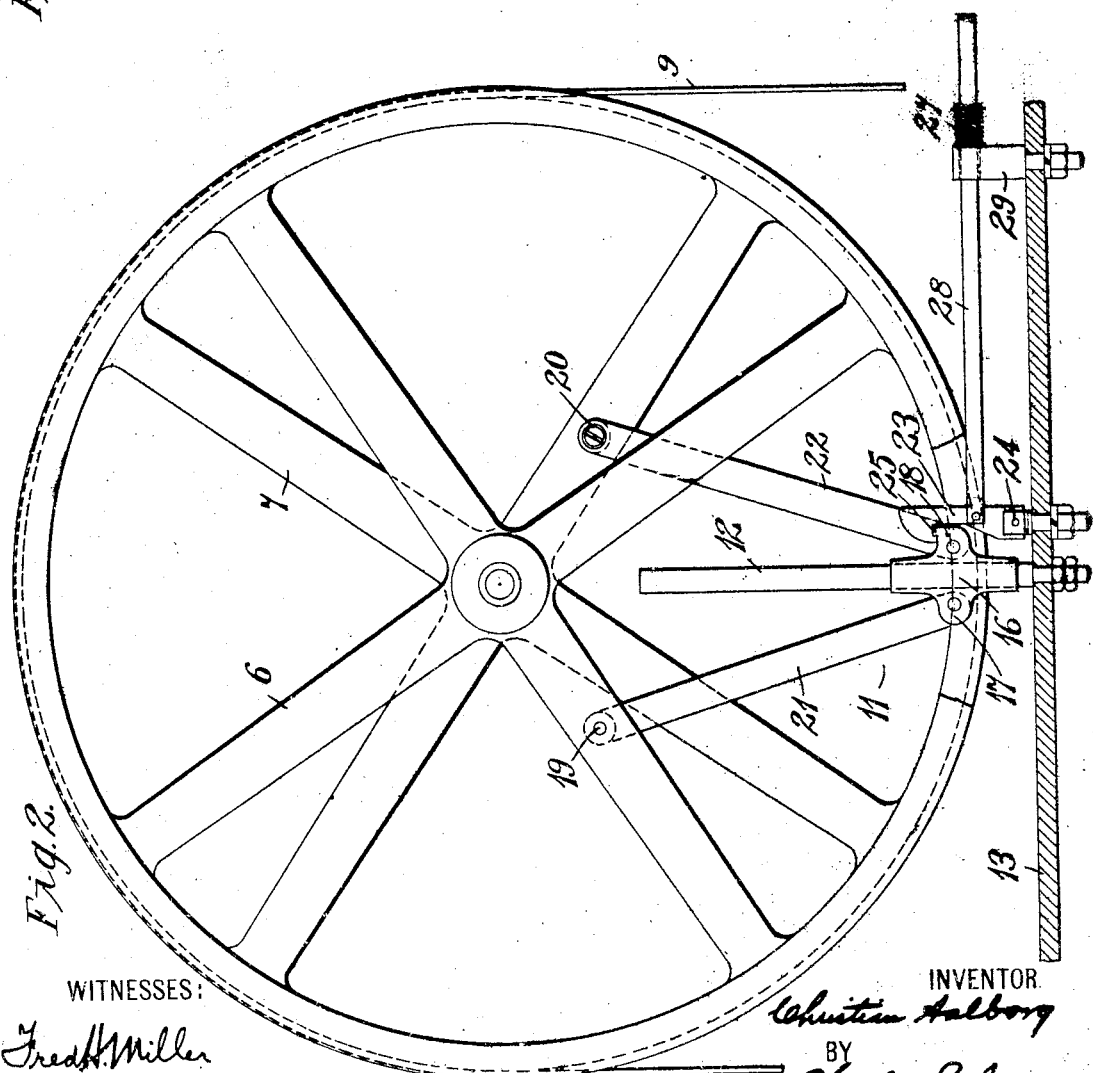
WITNESSES:
Fred H. Miller
R. J. Dearborn
INVENTOR
Christian Aalborg
BY
Wesley Olson
ATTORNEY

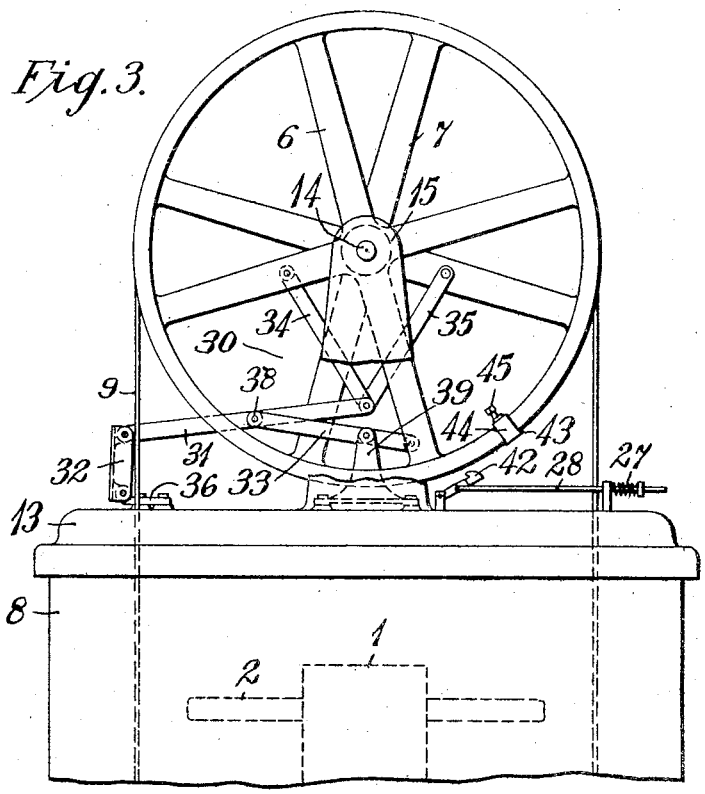
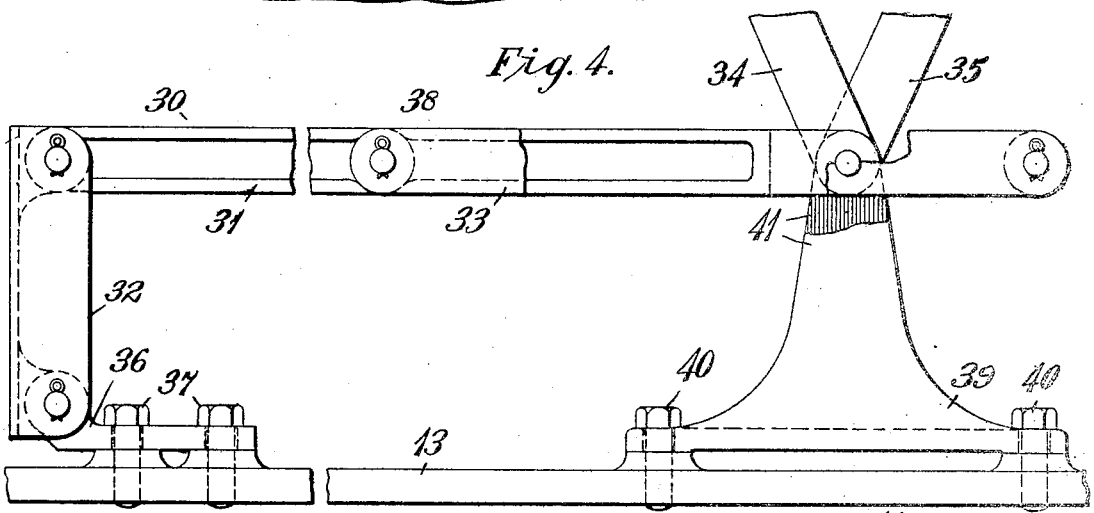
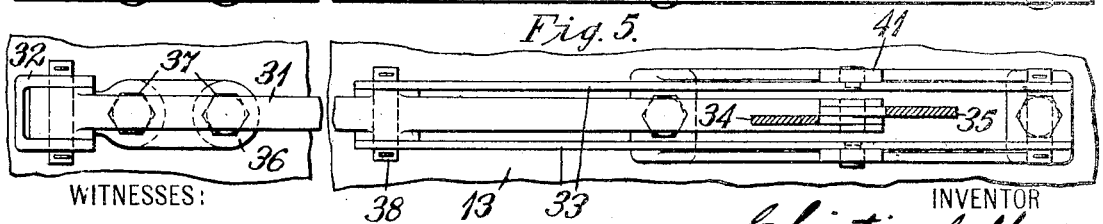

UNITED STATES PATENT OFFICE.

CHRISTIAN AALBORG, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

ELECTRIC-CIRCUIT REGULATOR.

1,104,796.      Specification of Letters Patent.      Patented July 28, 1914.

Application filed March 9, 1908. Serial No. 420,058.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Electric-Circuit Regulators, of which the following is a specification.

My invention relates to movable-coil regulators for electric circuits and it has for its object to provide, in devices of this character, means for automatically rendering the movements of the regulator coils interdependent and means for locking the coils at a predetermined point of their travel.

A well known type of regulator for governing either the voltage or the current of electric circuits comprises a pair of movable coils which surround a limb of a stationary core member and are influenced thereby, and pulleys from which the coils are suspended. The coils are suspended by means of cords or straps, each cord being connected to one side of one coil and the opposite side of the other coil so that movements of the coils toward or away from each other are accompanied by rotative movements of the pulleys in opposite directions.

The parts of the device are balanced, the relative motion of the coils being effected electro-magnetically by the amount of current which traverses their windings and, in order to make the regulator sensitive to relatively small variations, it is desirable to keep the movable coils in planes that are perpendicular to their line of motion.

According to my present invention, I so control the relative movement of the pulleys or sheaves from which the movable coils are suspended as to render the movements of the coils themselves interdependent.

Figure 1 of the accompanying drawings is an elevation of a regulator constructed in accordance with my invention and Fig. 2 is a view at right angles to that of Fig. 1 and on a larger scale, of the pulleys and suspension cords together with one form of interlocking mechanism adapted for carrying out my invention. Fig. 3 is a view, similar to that of Fig. 2, of a structure having a modified mechanism for operatively connecting the regulator pulleys and Figs. 4 and 5 are, respectively, a side elevation and a plan view of portions of the mechanism shown in Fig. 3.

Referring to Figs. 1 and 2 of the drawings, the regulator here illustrated comprises a stationary core member 1, stationary coils 2 and 3, movable coils 4 and 5 which are suspended from sheaves or pulleys 6 and 7 and an inclosing casing 8 in which the core and windings are included. Cords or straps 9 and 10 engage the grooved rims of the pulleys 6 and 7, and the opposite ends of each cord are connected to opposite sides of the respective coils 4 and 5; that is to say, each movable coil is connected at one side to one cord and at the other side to the other cord so that concurrent rotative movements of the pulleys 6 and 7 in opposite directions accompany approaching or receding movements of the coils.

In the actual operation of the regulator, as is well known, movement of the coils is brought about electro-magnetically and is automatically dependent upon the current traversing the coil windings, the pulleys following the movement of the coils. In order that the pulleys may always be constrained to move through equal angles in opposite directions and thereby maintain a parallel relation between the planes of the movable coils, I provide an interlocking mechanism 11 which comprises a vertical shaft 12 that projects upwardly from the cover 13 of the casing 8, between the pulleys 6 and 7. The pulleys themselves are rotatably mounted side by side on a horizontal shaft 14 which is supported by pillar blocks 15 that project upwardly from the cover 13, and the position of the vertical shaft 12 is such that its center line intersects the pulley axis. The shaft 12 is provided with an adjustable sleeve 16 having lateral projections 17 and 18 that are connected to corresponding points 19 and 20 on the pulleys 6 and 7 and on opposite sides of the pulley axis, by links 21 and 22. By this means, the pulleys are permitted to rotate concurrently only through predetermined equal angles in opposite directions.

In a suitable position of the coils for starting the regulation the pulleys may be locked by means of a latch 23 which is pivotally mounted on a pin 24 and is adapted to engage a lug 25 on the lateral projection 18 of the sleeve 16. The latch 23 is normally held out of engagement with the lug 25 by means of a spring 27 which acts through a rod 28, an attendant being relied upon to lock the coils when the regulator is inactive. The rod 28 is pivotally secured to the latch 23 and projects loosely through a bearing block 29 which is supported by the cover 13. The rod 28 extends substantially to the edge of the cover 13 so that it may be readily grasped by an attendant to force the latch into locking engagement with the lug 25. In order that the locking engagement just referred to may be effected, the pulleys 6 and 7 are turned manually to move the sleeve 16 to a position slightly below that indicated in Fig. 2, and, when the parts are in the positions shown, energization of the coils 4 and 5 will force them to approach each other farther and so actuate the pulleys initially as to depress the sleeve 16 and thus release its lug 25 from the latch 23. In order to automatically release the pulleys as above indicated, the coils 4 and 5 of the regulator must approach slightly when first energized because of the repulsion between the coils 2 and 4 and the coils 3 and 5. This action is produced in arc lamp regulators by reason of the fact that the electrodes of the lamps are in contact and permit a relatively large current to traverse the circuit for a short period when first started. The core and windings may, of course, be immersed in an insulating fluid contained in the tank 8.

In regulators of small capacity, it is especially essential to reduce the friction of the interlocking mechanism to a minimum in order that the regulator may be sensitive to slight variations in the element for which regulation is desired. Consequently, the mechanism illustrated in Figs. 3, 4, and 5, in which the frictional resistance to its movement is very low, is well adapted for the aforesaid use although it is not restricted to any size or type of regulator.

Referring specially to Figs. 3, 4, and 5, the pulleys or sheaves 6 and 7, mounted on the shaft 14, are here interlocked by means of a mechanism 30 which comprises a lever 31 and a plurality of links 32, 33, 34, and 35. One end of the lever 31 is joined, by a link 32, to a stationary hinge bracket 36 which is secured to the cover 13 by bolts 37 and its other end is connected to the pulleys 6 and 7 by links 34 and 35. An intermediate point 38 in the lever 31 is connected, by means of link 33, to a stationary bracket 39 which is secured to the cover by bolts 40 and is provided with projections 41. The arrangement of parts is such that a straight line vertical motion, which constrains the pulleys to rotate oppositely and concurrently, is imparted to the junction of the links 34 and 35. A latch 42, corresponding to the latch 23 of Figs. 1 and 2, is adapted to engage a projection 43 on a block 44 that is adjustably secured to the rim of the pulley 6 by a set screw 45. An adjustment for the most advantageous position of the movable coils for starting under any given load may thus be effected.

My invention is not restricted to the specific structure and arrangement of parts which are illustrated in the drawings and hereinbefore described, and I desire that only such limitations shall be imposed upon it as are indicated in the appended claims.

I claim as my invention:

1. In an electric regulator, the combination with a stationary core member, sheaves or pulleys rotatably mounted above the core member, and movable coils surrounding the core member and suspended from the pulleys, of means for rendering the movements of the pulleys interdependent.

2. In an electric regulator, the combination with a stationary core member, pulleys rotatably mounted above the core member and movable coils surrounding the core member and so suspended from the pulleys as to effect opposite rotative movements of the pulleys when they move toward or away from each other, of means for rendering the rotative movement of each pulley dependent upon that of the other.

3. In an electric regulator, the combination with a stationary core member, pulleys rotatably mounted above the core member and a pair of movable coils suspended from the pulleys, diametrically opposite points of each coil being connected to both pulleys, of means for permitting only concurrent rotative movements of the pulleys in opposite directions.

4. In an electric regulator, the combination with a stationary core member, sheaves or pulleys mounted above the core member, and movable coils surrounding the core member and suspended from the pulleys, of a stationary shaft, a sleeve movably mounted thereon and links severally connecting the pulleys to the sleeve.

5. In an electric regulator, the combination with a stationary core member, pulleys rotatably mounted above the core member and movable coils surrounding the core member and so suspended from the pulleys that an approaching or receding motion of the coils is accompanied by rotative movements of the pulleys in opposite directions, of a stationary shaft, a sleeve movably mounted thereon and links severally connecting the pulleys to the sleeve.

6. In an electric regulator, the combination with a stationary core member, pulleys rotatably mounted above the core member and a pair of movable coils suspended from the pulleys, diametrically opposite points of each coil being connected to both pulleys, of a stationary shaft the center line of which intersects the pulley axis, a sleeve movably mounted on the shaft and links connecting corresponding points of equal radius on the two pulleys to the sleeve for rendering the movements of the pulleys concurrent and opposite.

7. In an electric regulator, the combination with a stationary core member, sheaves or pulleys rotatably mounted above the core member and movable coils surrounding the core member and suspended from the pulleys, and means for rendering the movements of the pulleys interdependent, of means for locking the coils in predetermined positions.

8. In an electric regulator, the combination with a stationary core member, pulleys rotatably mounted above the core member, and movable coils surrounding the core member and so suspended from the pulleys as to effect opposite rotative movements of the pulleys when they move toward or away from each other, and means for rendering the movement of each pulley dependent upon that of the other, of means for locking the coils in predetermined positions.

9. In an electric regulator, the combination with a stationary core member, sheaves or pulleys mounted above the core member and movable coils surrounding the core member and suspended from the pulleys, of a stationary shaft, a sleeve movably mounted thereon and links severally connecting the pulleys to the sleeve, and a latch that is adapted to engage a lug on the movable sleeve at a predetermined point in the pulley movement.

10. In an electric regulator, the combination with a stationary core member, pulleys rotatably mounted above the core member and movable coils surrounding the core member and so suspended from the pulleys as to effect opposite rotative movements of the pulleys when they move toward or away from each other, of a stationary shaft, a sleeve movably mounted thereon and links severally connecting the pulleys to the sleeve, and a manually actuated latch adapted to engage a lug on the movable sleeve, at a predetermined point in the pulley movement.

11. In an electric regulator, the combination with a stationary core member, pulleys rotatably mounted above the core member and a pair of movable coils suspended from the pulleys, diametrically opposite points of each coil being connected to both pulleys, of a stationary shaft the center line of which intersects the pulley axis, a sleeve movably mounted on the shaft and links connecting corresponding points of equal radius on the two pulleys to the sleeve for rendering the rotative movements of the pulleys concurrent and opposite, and a latch adapted to engage a lug on the sleeve at a predetermined point in the movement of the pulleys, a spring for normally holding the latch out of engagement with said projection, and a rod for manually actuating the latch.

12. The combination with a stationary member, pulleys, and movable members suspended therefrom, of means for maintaining a predetermined relation between the movements of said pulleys.

13. The combination with stationary members, pulleys, and movable members suspended therefrom, of a straight-line-motion device for permitting only concurrent rotative movements of the pulleys in opposite directions.

14. In an electric regulator, the combination with stationary core members, pulleys mounted above the core members and movable coils influenced by the core members and suspended from the pulleys, of a straight-line-motion device for permitting only concurrent rotative movements of the pulleys in opposite directions.

In testimony whereof, I have hereunto subscribed my name this 27th day of February, 1908.

CHRISTIAN AALBORG.

Witnesses:
 WM. P. L'HOMMEDIEU,
 BIRNEY HINES.